Nov. 26, 1968      W. K. FRENCH      3,412,493

TAMPER-PROOF RECORD STRUCTURE

Filed May 2, 1966

INVENTOR.
WALTER K. FRENCH

ATTORNEY

United States Patent Office 3,412,493
Patented Nov. 26, 1968

3,412,493
TAMPER-PROOF RECORD STRUCTURE
Walter K. French, Montrose, N.Y., assignor to International Business Machines Corporation, Armonk, N.Y., a corporation of New York
Filed May 2, 1966, Ser. No. 546,793
7 Claims. (Cl. 40—2.2)

ABSTRACT OF THE DISCLOSURE

This invention relates to a record structure and more particularly to a structure for a record, such as an identification card, which structure protects the indicia on the record from being counterfeited or tampered with.

---

The record structure consists of a sheet of an amorphous material. Indicia is recorded on the sheet. A nonlinear diffraction pattern is then stamped into the sheet with at least a portion of the diffraction pattern being in the region of the indicia. The sheet with the diffraction pattern stamped into it is encapsulated in a material which is physically and chemically identical to that of the sheet. If indicia appears on both sides of the sheet, a diffraction pattern is stamped on both sides of the sheet.

The most common type of record which it is desired to protect against counterfeiting or tampering, such as by alteration, is a personnel identification (ID) card such as is used to gain admittance to secured areas or to purchase goods or services on credit. The following discussion will therefore be with reference to such ID cards, although it is understood that what is said for the ID cards will apply equally to similar indicia-bearing records.

An identification card generally contains the picture, signature, fingerprint, physical description, or some combination of these, of the individual to whom the card is issued. These characteristics are compared against those of the bearer of the card in order to verify his identity. Depending on the use to which the card is being put, it may also contain the individual's name and address, his man number, his security classification, his credit rating, or a license indication and number. However, identification cards of this type are useful for verifying the identity of an individual, and supplying his security, credit, or other status, only so long as the contents thereof may be protected against counterfeiting or tampering. For example, if the picture or fingerprint of the person to whom the card was issued can be removed and a new one substituted in its place, the card becomes worthless as a source of identification. Similarly, if the security classification or credit rating printed on the card may be altered, or if a complete new card may be easily, and inexpensively, counterfeited without ready detection, the cards become useless for their intended purpose. It is therefore important that identification cards be constructed in such a manner as to both prevent the alteration or other tampering with the indicia recorded thereon, and to make counterfeiting of a record extremely difficult and expensive.

In the past, a measure of protection has been secured for identification cards by encapsulating them in plastic. Encapsulating however, provides only slight protection for the record since it is possible to slit the encapsulating coating, remove the record, alter it, and either reencapsulate the record or insert it into the old encapsulating coating and reseal the coating in a manner such as to defy easy detection. Greater protection is secured by printing the identification indicia on a card which has been impregnated with or has had printed thereon, a complex line and curve pattern. Theoretically, an alteration of the record causes a break in the pattern which may be detected if the card is carefully looked at. However, these line patterns are visible to the naked eye and, therefore, may be duplicated by a relatively skilled counterfeiter. Also, since the patterns are easily visible, any breaks in the pattern may be touched up by a fairly skilled individual after desired alterations have been made. Counterfeited, or touched up records of this type would, when the work is done by a skilled individual, be extremely difficult to detect.

From the above it is seen that, while existing counterfeiting and tamper preventing schemes provide some measure of protection for the identification record, a person or group with sufficient resources to hire a skilled professional can still successfully counterfeit an ID card, or alter an existing ID card to contain desired indicia, with a very good chance that the counterfeiting or alteration will not be detected. In order to fully protect a record, such as an ID card, from either counterfeiting or alteration, it is necessary that first, the record be encapsulated in such a manner as to make it impossible to remove the record from its encapsulating coating without marring the record sufficiently to prevent it from being revised; and second, that the identifying grid or pattern on the record be of such a nature as to defy touching up once it has been marred and to be prohibitively expensive to counterfeit.

It is therefore a primary object of this invention to provide a totally tamper-proof record.

Another object of this invention is to provide a tamper-proof record which it is, at least, not feasible to counterfeit.

In accordance with these objects this invention provides a tamper-proof record structure which includes a record bearing sheet of an amorphous material. Indicia which it is desired to protect is recorded on the sheet. A diffraction pattern is then stamped into the sheet with at least a portion of the diffraction pattern being in the region of the indicia to be protected. The sheet, with the diffraction pattern stamped into it, is encapsulated in a material which is physically and chemically identical to that of the sheet. If indicia appears on both sides of the record, then diffraction patterns are stamped into both sides of the record.

The foregoing and other objects, features and advantages of the invention will be apparent from the following more particular description of preferred embodiments of the invention as illustrated in the accompanying drawings.

When light strikes a diffraction grating a pattern of prismatic light is formed. The nature of this pattern depends on the shape of the ridges of the diffraction pattern itself. For example, for a circular diffraction grating, such as that formed by the ridges of a phonograph record, the prismatic color pattern is formed in radial bands. As the spacing between the ridges of the diffraction pattern becomes more accurate and smaller, the colors of the prismatic light pattern become deeper and sharper. A point may be reached where the lines of the diffraction pattern itself are no longer visible by any known means and the existence of the diffraction pattern is manifest only by the prismatic effect which it has no incident light. Patterns of this type, which have a ridge density of about 10,000 lines/inch, or in other words a ridge spacing of about .0001", are generally made with stamps formed on an automatically-controlled ruling engine.

Figure 1:
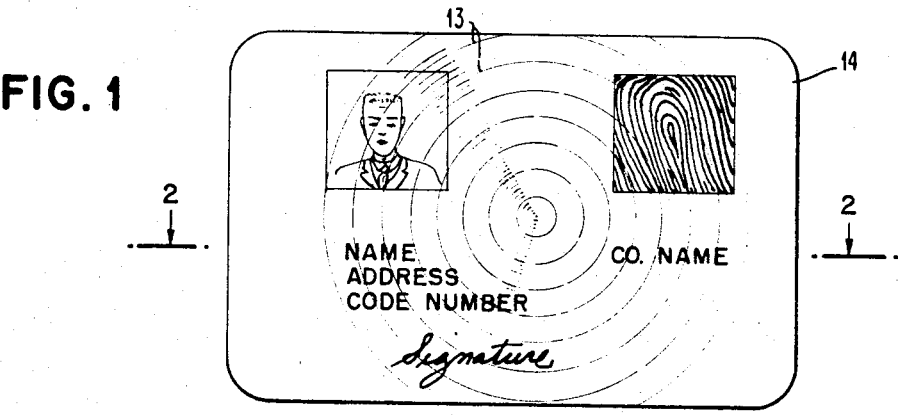
FIG. 1 is a semi-diagrammatic top view of one embodiment of the invention.
Figure 2:
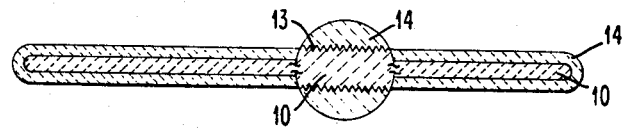
FIG. 2 is a partially expanded view taken along the line 2—2 in FIG. 1.

FIG. 1 shows an identification card which utilizes the diffraction pattern phenomena described above in order to render the indicia thereon tamper proof. Referring to FIGS. 1 and 2 together, it is seen that the card consists of an indicia bearing sheet 10 on which is recorded, for example, the individual's picture, his fingerprint, his signature, and various other information concerning the individual such as his name, address, code number, etc. Sheet 10 may be of any amorphous substance such as a thermo-plastic or thermo-setting plastic, or glass. Sheet 10 should, however, initially have a smooth surface. Since sheet 10 must be opaque, and as will be seen later, must be of a material which is substantially identical to the transparent encapsulating material, it is necessary that the sheet 10 be impregnated with a pigment.

Sheet 10 has a diffraction pattern 13 stamped into the side of it which bears indicia it is desired to protect. If both sides of sheet 10 bears indicia, diffraction patterns are stamped into both sides. The actual diffraction pattern which is stamped into sheet 10 is so fine as to not be visible by any known means. In FIG. 1, it has been assumed that the pattern is an array of concentric circles. Since the actual ridges of the array would not be visible, phantom lines have been used to illustrate a few representative ridges of the array. Similarly, in FIG. 2 the ridges are only visible in the expanded portions of the figure. With a concentric-circle array, such as that shown in FIG. 1, radial bands of prismatic light would be observed by a viewer indicating the existence of the diffraction pattern.

Sheet 10 of the identification card is encapsulated in an encapsulating cover 14 which is of the material which is either identical to that of the material of sheet 10, or is of a material which is at least chemically and physically indistinguishable therefrom. The reason for selecting an encapsulating material of this type will be apparent later.

In constructing a card of the type shown in FIGS. 1 and 2 a ruling engine would initially be employed to cut a die or stamp having the desired pattern. An unset card of the proper material having the desired indicia recorded thereon would then be sent to a place where the die was kept, the diffraction pattern 13 stamped into the unset card, and the card then allowed to set. When stamping the card, the unstamped side would either be held on a hard flat surface, or the sheet would be positioned between two stamps, and both sides of the sheet stamped simultaneously. When the sheet has been stamped and set, it is encapsulated, in a standard manner, in a material 14 having the same chemical and physical properties of the material of the sheet 10. Since, as will be seen later, a difference in the nature of the materials of the sheet 10 and the encapsulating coating 14 would defeat the objectives of this invention, a test should be made, some time before encapsulating, to be sure that the sheet 10 is of the proper material.

When an identification card has been constructed in the manner indicated above, it is impossible to separate the sheet 10 from the encapsulating coating 14 by either chemical or physical processes without destroying the diffraction grating 13 on the sheet 10. Since the material of the encapsulating coating and the sheet 10 are chemically identical, any solvent which will dissolve the encapsulating coating will also dissolve sheet 10. Also, since the encapsulating coating flows into the valleys between ridges of the diffraction pattern, and the encapsulating coating is chemically bonded to the sheet 10, any attempt to cut off coat 14 will result in the cutting of the diffraction pattern. Further, any attempt to remove a portion of the ID card, such as for example the photograph or the fingerprint, and substitute other indicia for it, will cause a break in the lines of the diffraction pattern. Since the lines of the diffraction pattern cannot be viewed, it is impossible to stamp a corresponding diffraction pattern into the substitute portion of the ID card and get it to match up exactly with the pattern on the remainder of the card. The mismatch in the ridges of the diffraction pattern will cause a clear discontinuity in the prismatic color pattern. Therefore, any attempt to substitute indicia on sheet 10 will be readily apparent to even a relatively unskilled observer. Similarly, any attempt to alter indicia on the sheet 10, such as, for example, by changing the credit or security rating of the individual, will cause a break in the diffraction pattern which would be easily seen as a discontinuity in the prismatic color pattern and which due to the invisible nature of the diffraction pattern, may not be touched up.

From the above, it is apparent that the only way in which an identification card constructed in accordance with the teachings of this invention may be falsified is to counterfeit an entire new document. For a concentric circle diffraction pattern such as that shown in FIG. 1, counterfeiting would, however, be fairly difficult and expensive. Suitable dies for stamping patterns of this type are commercially available but are expensive in sizes large enough to cover an ID card. A counterfeited record using a cheaper die with a less finely cut pattern, could be detected by a reasonably trained observer since the prismatic color pattern would be pale and less sharp.

Figure 3:
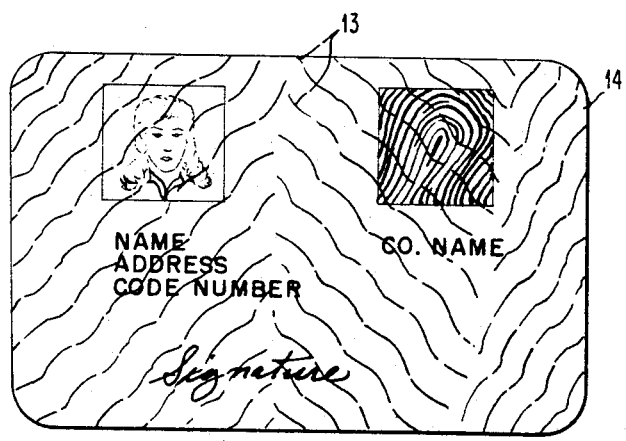
FIG. 3 is a semi-diagrammatic front view of an identification card of an alternative embodiment of the invention.

If greater security against counterfeiting is desired, a more complex diffraction pattern, such as, for example, that shown in FIG. 3, could be stamped into the sheet 10. In FIG. 3, phantom lines have again been used to illustrate the diffraction pattern since the actual lines of the pattern would not be visible to the human eye. Diffraction patterns which cause almost any desired prismatic light pattern when light is shone on them may be constructed. Dies for stamping such complex diffraction patterns would be prohibitively expensive for anyone except the Government or other central agency who was using the die to stamp out millions of cards. The cost of the die would defeat any attempt at counterfeiting. Since any attempt to cut off the encapsulating coating would also destroy the diffraction grating, the grating could not be copied by standard stamping techniques such as those employed in the photograph industry.

Figure 4:
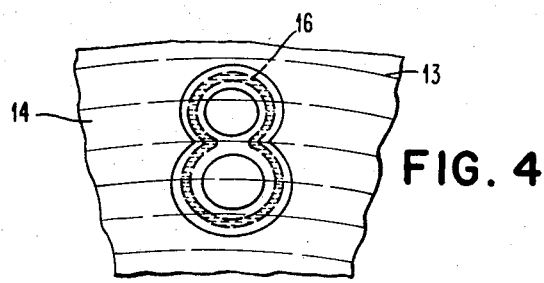
FIG. 4 is a semi-diagrammatic view of a single character of another alternative embodiment of the invention.

While the records described above are believed to be absolutely tamper proof, FIG. 4 shows a scheme for further protecting selected indicia on the record. Assume that it is desired to absolutely protect the credit rating or security classification on a record against any form of tampering. The letters and numericals of this portion of the record could be over-stamped with a diffraction pattern 16 which has the same shape as the character to be protected, but which is slightly smaller in size. This over-stamp mars the master diffraction pattern and makes the nature of the character visible even if the printed character underneath it is altered. Thus even if it were possible to copy the overall stamped pattern it would be impossible to change the indicies since there are portions of the pattern which would be missing after such change. It is further possible to vary the orientation of the diffraction pattern with respect to the indicies on the card. Thus the picture cut off of one card and placed in another card would not only show the cutting line but would show a radically different pattern in the entire picture area.

While the discussion so far has been shown in FIGS. 1 and 3, the invention may be used to protect any form of indicia-bearing record from tampering and any desired diffraction pattern may be stamped into the sheet 10.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A tamper-proof record structure comprising:
a record bearing sheet of an amorphous material, said sheet having indicia thereon which it is desired to protect from tampering;

a non-linear diffraction pattern stamped into said sheet, at least a portion of said pattern being in the region of said indicia;

and an encapsulating coating for said sheet of a material substantially the same as that of said sheet.

2. A structure of the type described in claim 1 wherein the ridges of said non-linear diffraction pattern are so closely spaced as to be visible only by the effect which they cause on incident light.

3. A structure of the type described in claim 2 wherein said non-linear diffraction pattern is a pattern of concentric circles.

4. A structure of the type described in claim 2 wherein said non-linear diffraction pattern is a complex line-curve pattern.

5. A structure of the type described in claim 2 wherein a non-linear diffraction pattern is stamped into both sides of said sheet.

6. A structure of the type described in claim 1 wherein the amorphous material is a plastic.

7. A structure of the type described in claim 1 wherein said non-linear diffraction pattern includes a major pattern covering most of said sheet and an overstamp pattern covering selected indicia on said sheet.

References Cited

UNITED STATES PATENTS

| | | | |
|---|---|---|---|
| 1,549,169 | 8/1925 | Vogt | 40—135 |
| 2,268,258 | 12/1941 | Lytle | 40—135 |
| 2,588,067 | 3/1952 | Whitehead | 40—2.2 |
| 3,152,901 | 10/1964 | Johnson | 283—7 X |
| 3,313,052 | 4/1967 | Malster | 40—2.2 |

EUGENE R. CAPOZIO, *Primary Examiner.*

W. J. CONTRERAS, *Assistant Examiner.*